(12) United States Patent
Schafhitzel

(10) Patent No.: US 8,823,555 B2
(45) Date of Patent: Sep. 2, 2014

(54) APPARATUS FOR DISPLAYING TERRAIN ON A DISPLAY APPARATUS OF AN AIRBORNE VEHICLE

(75) Inventor: Tobias Schafhitzel, Meersburg (DE)

(73) Assignee: EADS Deutschland GmbH, Ottobrunn (DE)

( * ) Notice: Subject to any disclaimer, the term of this patent is extended or adjusted under 35 U.S.C. 154(b) by 84 days.

(21) Appl. No.: 13/701,287

(22) PCT Filed: May 25, 2011

(86) PCT No.: PCT/DE2011/001105
§ 371 (c)(1),
(2), (4) Date: Nov. 30, 2012

(87) PCT Pub. No.: WO2012/006983
PCT Pub. Date: Jan. 19, 2012

(65) Prior Publication Data
US 2013/0069801 A1    Mar. 21, 2013

(30) Foreign Application Priority Data
Jun. 4, 2010 (DE) .......................... 10 2010 022 726

(51) Int. Cl.
*G08B 21/00* (2006.01)

(52) U.S. Cl.
USPC ............................ 340/945; 340/946; 340/979

(58) Field of Classification Search
USPC ................ 340/945, 946, 967, 979, 980, 990, 340/995.1; 701/3, 16, 301; 345/427, 619; 382/103, 294
See application file for complete search history.

(56) References Cited

U.S. PATENT DOCUMENTS

| 7,091,881 | B2* | 8/2006 | Judge et al. ................... 340/979 |
| 7,148,861 | B2 | 12/2006 | Yelton et al. |
| 7,352,292 | B2* | 4/2008 | Alter et al. .................... 340/945 |
| 7,486,291 | B2* | 2/2009 | Berson et al. ................. 345/427 |
| 8,265,803 | B2* | 9/2012 | He .................................... 701/3 |
| 2007/0297696 | A1 | 12/2007 | Hamza et al. |

(Continued)

FOREIGN PATENT DOCUMENTS

| EP | 1 084 380 B1 | 1/2010 |
| WO | WO 2008/018906 A2 | 2/2008 |

OTHER PUBLICATIONS

Corresponding International Search Report with English Translation dated Mar. 1, 2012 (seven (7) pages).
Renato Pajarola et al., Large Scale Terrain Visualization Using the Restricted Quadtree Triangulation, Oct. 1998, (nine (9) pages).

(Continued)

*Primary Examiner* — Van T. Trieu
(74) *Attorney, Agent, or Firm* — Crowell & Moring LLP

(57) ABSTRACT

An apparatus for displaying terrain on a display apparatus of an airborne vehicle is provided. The apparatus includes a synthetic vision system having a terrain and obstruction database, an enhanced vision system with sensors for recording terrain data, a height and position sensor for determining the flight state data, a display apparatus, a processor for fusion of the data from the synthetic vision system and from the enhanced vision system. The height information that is produced by the synthetic vision system and the enhanced vision system is stored as pixels in a two-dimensional grid network. The fusion processor uses an error function for insertion of a pixel into the two-dimensional grid network. The error function provides an estimate of the size of the respective cell in which the pixel is stored, from the distance between the pixel and the sensor position.

4 Claims, 5 Drawing Sheets

(56) References Cited

U.S. PATENT DOCUMENTS

Figure 1:
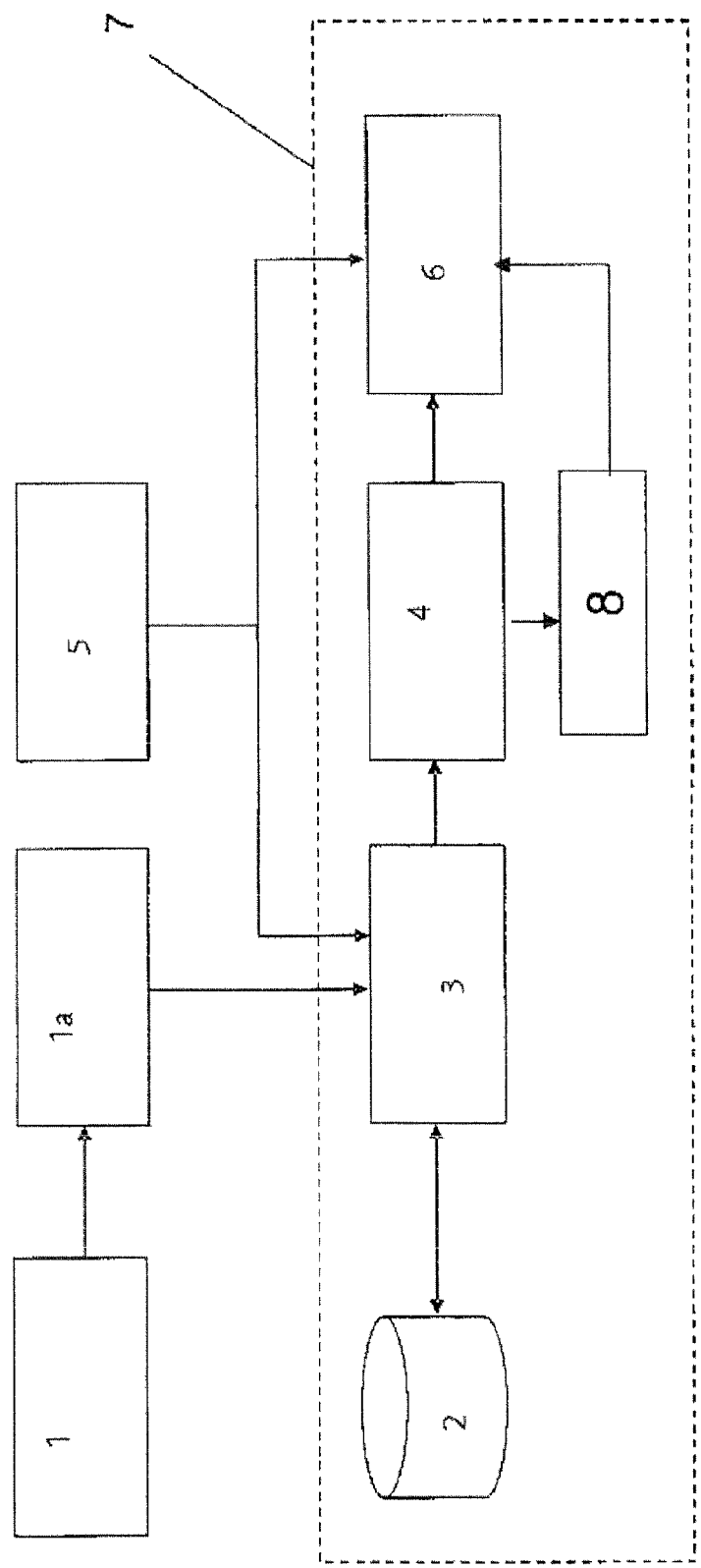

| | | |
|---|---|---|
| 2009/0040070 A1 | 2/2009 | Alter et al. |
| 2009/0303251 A1 | 12/2009 | Balogh et al. |
| 2010/0026525 A1 | 2/2010 | Feyereisen et al. |
| 2011/0142281 A1* | 6/2011 | He .............................. 382/103 |

OTHER PUBLICATIONS

Stepane Dubet, "Terrain, Obstacle and Airport Databases for Electronic Flight Bags", Institute of Electrical Engineers, IEEE, 2003, pp. 13.D.2-1-13.D.2-11.

* cited by examiner

APPARATUS FOR DISPLAYING TERRAIN ON A DISPLAY APPARATUS OF AN AIRBORNE VEHICLE

BACKGROUND AND SUMMARY OF THE INVENTION

Exemplary embodiments of the present invention relate to a device for displaying terrain on a display device of an aircraft.

In the context of so-called pilot assistance systems, display instruments for a synthetic external view are always used when outside weather conditions, darkness or so-called brownout/whiteout phases (sand or snow blown up) impair or even completely obscure the pilot's vision. Conventional methods for the generation of a synthetic external view are so-called synthetic vision systems (SVS) or enhanced vision systems (EVS). While in the case of SVS the data to be represented are taken from a database, i.e., terrain and information about obstacles must already be available, in the case of EVS systems cameras or sensors are used in order to directly process the data acquired during the flight.

The prior art is essentially restricted to synthetic vision systems and enhanced vision systems, in which the sensor image is usually represented directly, i.e., two-dimensionally.

WO 2008/018906 describes the data validation of terrain database data by means of sensor data. The method described is based on a fixed number of data points (given by the database) and applies the validation using the acquired sensor data. A point is in this case characterized as "validated, not validated or warning area" as an output.

U.S. Pat. No. 7,148,861 B2 describes data fusion of two data sources at the 2D pixel level. Besides the coordinate systems of the two data sources, a further third coordinate system is introduced that is intended to overcome the different perspectives of the data sources.

EP 1 084 380 B1 describes methods for the visualization of database and sensor data. Further disclosures regarding sensor data fusion can be found in US 2010/0026525 A1 and US patent 2007/0297696 A1.

US 2009/0040070 A1 describes a device for displaying terrain on a display device of an aircraft.

Exemplary embodiments of the present invention provide an improved device for displaying terrain on a display device of an aircraft.

The device according to the invention comprises a synthetic vision system having a terrain and obstacle database, an enhanced vision system having sensors for acquiring terrain data, a height and position sensor for determining flight status data, a display device, a processor for fusion of the data from the synthetic vision system and from the enhanced vision system, the height information generated by the synthetic vision system and the enhanced vision system being stored as pixels in a two-dimensional grid network, a graphics processor that sends the terrain data generated by means of the fusion processor to the display device while taking into account the flight status data determined by means of the height and position sensor.

According to the invention, the fusion processor uses an error function when inserting a pixel into the two-dimensional grid network, the error function providing an estimate of the size of the respective cell, in which the pixel is stored, from the distance of the pixel from the sensor position. In addition to the measured distance between the pixel and the sensor position, other known sensor- or navigation-specific parameters may also be taken into account.

Advantageously, the two-dimensional grid network represents a parameterization of the tangential surface of the terrestrial sphere with a hierarchical non-regular structure and a predeterminable maximum number of cells, the center of the grid network imaging the position of the sensor of the enhanced vision system. The number of cells is not constant, since it depends on the refinement of the cell structure. For the case of the maximum refinement level of a cell, the maximum resolution resulting therefrom may be calculated.

The processor for fusion of the data from the synthetic vision system and from the enhanced vision system will also be referred to below as a ground pixel container.

The present invention involves the combination of the two systems, a so-called enhanced synthetic vision system (ESVS), i.e., the fusion of available terrain and obstacle information that are stored in databases, and 3D sensor data (for example LADAR, RADAR) that are already available in a classified form owing to prior segmentation.

The present invention combines the advantages of synthetic vision systems and enhanced vision systems by real-time segmentation of 3D terrain data acquired by a sensor and fusion thereof with existing terrain and obstacle data from a database. The segmentation of the sensor data in this case decides on a pixel basis whether the respective pixel is to be classified as part of the terrain or as an obstacle. The segmentation is carried out according to methods known from the prior art.

While the pixels classified as obstacles are treated as a 3D point cloud, the so-called "ground pixels" are stored in the ground pixel container. This ground pixel container represents an adaptive grid (i.e., corresponding to the accuracy of a measurement point) that corresponds via its cells to direct sampling of the Earth's surface. Each cell respectively receives a data value, which is then to be considered as a height value for the complete spatial extent of the cell. The ground pixel container in this case supports the "See & Remember" concept, i.e., every spatial region that has been sampled once is stored first in the ground pixel container and subsequently in a database.

BRIEF DESCRIPTION OF THE DRAWING FIGURES

Figure 2:
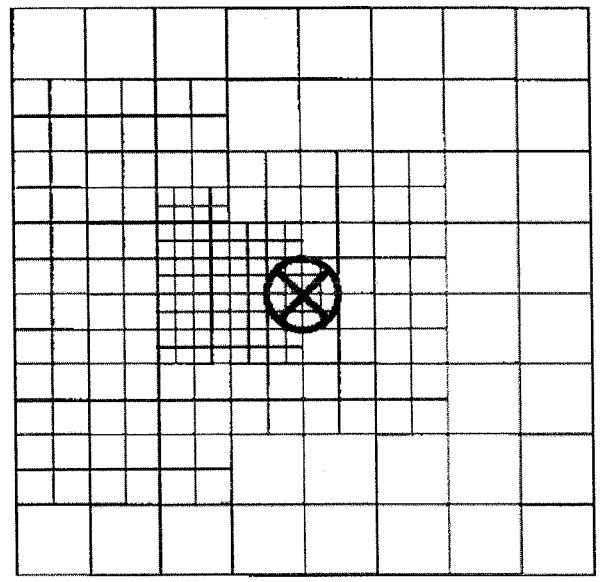
Figure 2:
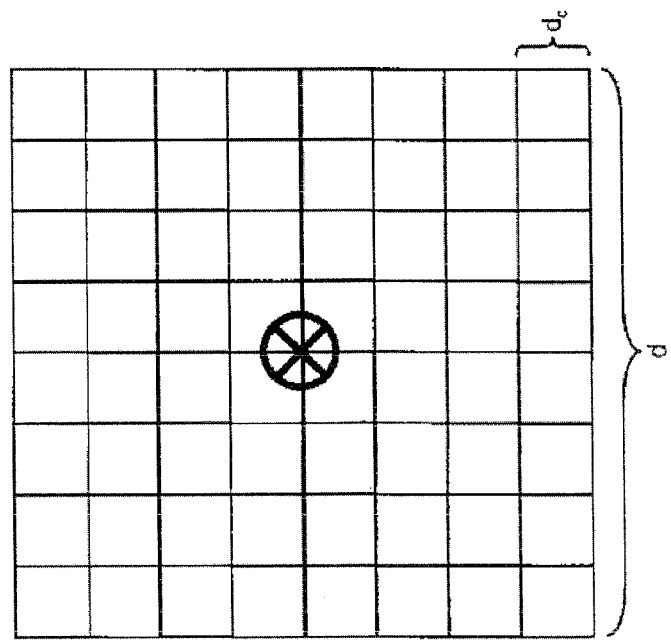
Figure 3:
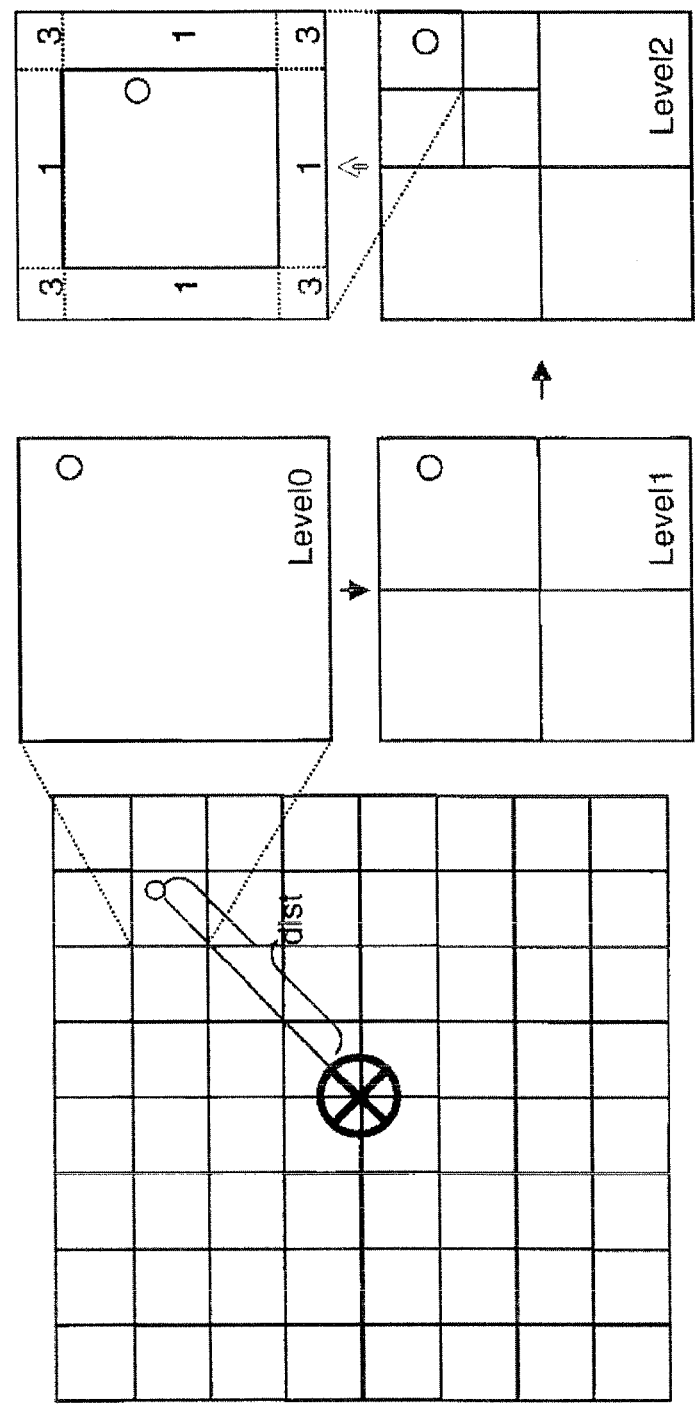
Figure 4:
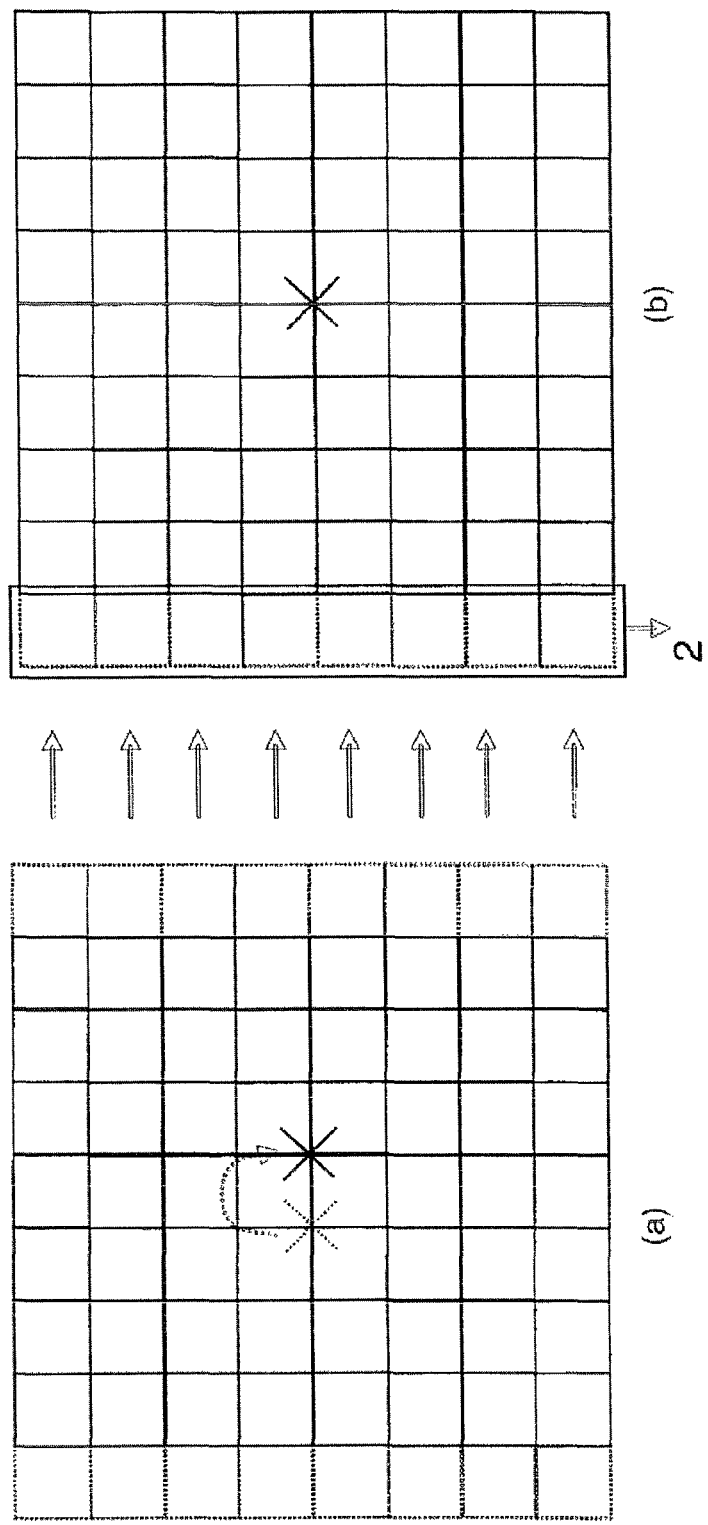
Figure 5:
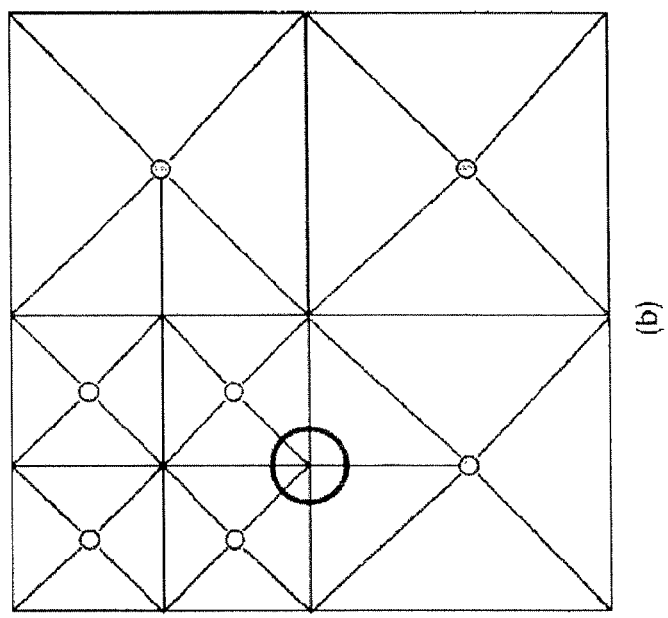
Figure 5:
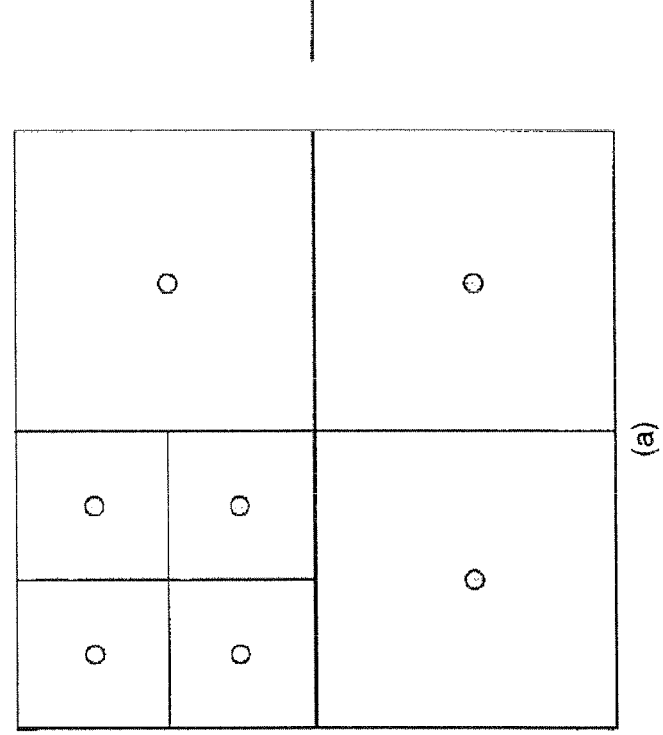

The invention will be explained in more detail below with the aid of drawings, in which:

FIG. 1 shows a schematic structure of the device according to the invention,

FIG. 2 shows an exemplary representation of the ground pixel container with a spatial subdivision structure, FIG. 3 shows an exemplary representation of the ground pixel container, into which a ground pixel is inserted, FIG. 4 shows an exemplary representation of the ground pixel container in the event of a position change of the sensor for acquiring terrain data, FIG. 5 shows an exemplary representation of a detail of the ground pixel container with triangulation of the data for visualization.

DETAILED DESCRIPTION

FIG. 1 shows a schematic structure of the device according to the invention. A sensor 1 for generating a raw data image and a module 1*a* for segmenting the ground pixels are provided. A database 2 for storing height data, also referred to below as an elevation database, is furthermore provided.

The sensor 1 and the database 2 are connected to the ground pixel container 3. Between the ground pixel container 3 and the database 2, there is a read and write database link for the interchange of database data and sensor data.

A visualization module 4 is connected to the ground pixel container 3 via an interface. A module 5 for measuring the flight status data is connected to the ground pixel container 3 and the visualization module 4. The visualization module 4 is connected to a display device 6 for representing the terrain. The visualization module 4 is essentially used to process the data suitably with the aid of known visualization algorithms so that the data can be displayed on the display device 6.

In FIG. 1, the reference 7 denotes the enhanced synthetic vision system (ESVS) module. The ESVS module 7 contains the ground pixel container 3, the visualization module 4 comprising the visualization (or triangulation) algorithms, and the display device 6. As an input, there is a link respectively to the sensor 1 and to the database 2. The output corresponds to a link to the database 2, in order to write data back, and to a geometry memory 8 that contains the ground surface geometry resulting from the triangulation algorithms. The data from the geometry memory 8 are delivered directly to the display device 6.

The processing chain of the ESVS module 7 receives as input the raw data obtained from the sensor 1, which may be interpreted as a depth image or, by taking into account the flight status data, as a 3D point cloud. This point cloud is first subjected to classification, i.e., for each acquired data point a decision is made as to whether the latter is to be considered as a component of the ground or as an object rising therefrom, not classified in further detail.

In the explanations below, only the data points classified as "GROUND" will be considered. Furthermore, flight status data from the module 5 for measuring the flight status data are required as input, as they are delivered by a navigation system, consisting of: the position in the WGS84 coordinate system, the flight altitude relative to MSL and the flight attitude angles. The classified sensor images, as they result from the ground segmentation, are sent together with the flight status data to the ground pixel container 3. The flight status data are furthermore required once more in a subsequent processing step, i.e., for the visualization.

The ground pixel container 3 forms the core module of the data processing chain for the fusion of the existing terrain and obstacle data with the raw sensor data. It is responsible for the storage of all collected ground pixel data within a spatially limited region, and for the post-processing of these data on the one hand for the subsequent visualization algorithms in the visualization module 4, and on the other hand for the storage in an elevation database 2.

The ground pixel container corresponds to a spatially constantly defined region around a defined center. FIG. 2 illustrates the structure of the container. The ground pixel container has spatial discretization with a defined side length d (left-hand representation in FIG. 2). The representation is to be regarded as a plan view, i.e., as parameterization of the tangential surface of the Earth, the position of the sensor forming the center of the container. The area covered by the container is discretized by n cells with an edge length dc, which are in turn used as spatial subdivision structures, here quadtrees (right-hand representation in FIG. 2).

On the basis of two mutually orthogonal tangential vectors in a north-oriented coordinate system (local geodetic coordinate system), the area covered by the ground pixel container is spanned with respect to an origin established at a time to. In illustrative terms, this process may be explained as a plan view on the Earth's surface, in which the sensor position (for example the GPS position of the aircraft on which the sensor is installed) forms the center of the area which the ground pixel container processes. This area, having a side length d that may readily amount to several kilometers, is subdivided into n cells.

The basic concept of the ground pixel container is in this case to store height values in the cells, which corresponds mathematically to a height field $f(x,y) \rightarrow z$.

In order to overcome measurement inaccuracies that occur, the equidistant regular structure (i.e., a constant cell size dc) of the ground pixel container is extended by further spatial subdivision mechanisms. The measurement inaccuracies essentially affect the three-dimensional positions of the ground pixels that are sent from the preprocessing to the ground pixel container. Thus, it may be assumed that the effect of mechanical sensor inaccuracies as well as the inaccuracy of the (inertial) navigation system (INS) used is that the position of a ground pixel cannot be guaranteed.

Possible error sources in this case are:
mechanical sensor errors inside the sensor
installation errors, for example due to mounting inaccuracies
INS angle errors, i.e., inaccuracies of the flight attitude angle
INS position errors, i.e., an inaccurate position of the aircraft Since the aforementioned error sources do not affect each ground pixel equally, but are dependent on certain factors, the inaccuracy of each sampling point may be considered individually.

To this end, 2 related mechanisms may be used. On the one hand, a quadtree known from the prior art may be used. The quadtree is used as a spatial subdivision structure and, starting from the cell size dc, divides the latter respectively into 4 subcells of equal size, and on the other hand an error function fe which expresses the error susceptibility of a sampling point as a function of defined parameters. A simple example of this would be $f_e(\text{dist}) = f_{Sensor} + 4*\sigma(\overline{e})$, a distance-dependent error being calculated here as a function of a constant sensor error and the 4-sigma value, i.e. the maximum angle error of the INS. This error function would behave linearly and will be used again for illustration below.

On the basis of FIG. 2 (left-hand representation), the quadtree is now applied to each cell. In detail, this means that each cell of the ground pixel container corresponds to the coarsest considered level, i.e., the coarsest resolution or "Level0", of a quadtree.

If a cell is now intended to be refined by one level, then the cell having the side length dc will be subdivided into four cells of size dc/4. Since the method is a recursive method, this subdivision may be applied again to each of the four new cells so that a structure similar to the right-hand representation in FIG. 2 is finally obtained. This illustrates that the Earth's surface can be sampled with various degrees of detail by using a quadtree, for example in order to take the error susceptibility of a sampling point into account. Here, the aforementioned error function also comes into play again; it is used as a criterion for deciding which individual quadtree level should be assigned to a ground pixel.

If an incoming ground pixel is now intended to be imaged into the quadtree, then a method that is illustrated by FIG. 3 will be used. In order to insert a ground pixel into the ground pixel container, starting from the sensor position the distance to the respective ground pixel is determined. This is used as input for an error function which calculates an appropriate cell size, for example a quadtree cell size, from the underlying error. In this example, the quadtree resolution should be Level2, i.e., the original cell is subdivided two times.

The last step, at the top right in FIG. 3, deals with the edge zones. If the degree of the respective deviation is great enough that the respective ground pixel could equally well lie in the neighboring cell, then it is copied and also inserted into the latter. The respective numbers describe the number of neighboring cells affected if the ground pixel were to be allocated in the marked zones.

The degree of the deviation corresponds essentially to the spatial measurement error (specified, for example, in meters) of the individual ground pixel and can be derived from the error function fe. The highest level of the quadtree (i.e., the smallest cell) should be selected in such a way that, on the basis of the error interval to be supported (here in particular the greatest error still permissible for this cell), enough space remains in the cell in order to collect the ground pixels without unnecessary copying (see FIG. 3, top right), because too small a selection of the cell leads to expensive copying of the ground pixels into the neighboring cells. That is to say, a careful selection of a discrete imaging QuadtreeLevel=$f_{level}$ ($f_e$(dist)) of the sensor error for the cell sizes to be used is indispensable. An exemplary implementation of this imaging would be QuadtreeLevel=($L_{max}$−1)−$\log_2$(2*$f_e$(dist)), where $L_{max}$ corresponds to the maximum supported quadtree level. The degree of the deviation $f_e$(dist) is multiplied by 2, since this value corresponds to a positioning error equal to a radius around an approximated position. The true position of a point may, however, lie anywhere within a circle having the radius $f_e$(dist), and the cell size must therefore also take into account at least the diameter of this circle.

Detailed determination of the edge width on the basis of distributions and probabilities will not be discussed here.

Once the associated cell size has been determined, distinction is to be made between the following cases:

1.) The cell was originally empty: it is subdivided according to the spatial subdivision mechanism and the new value will be inserted. The cell may be further subdivided later on, but only by inserting a new value whose error (for example because of a shorter distance from the sensor at the acquisition time) is less than the existing one. The distance of an already stored value from a new position due to the grid displacement is unimportant since the measurement accuracy (i.e., the error at the acquisition time) remains unchanged by this and will not be corrected subsequently.

2.) There is already a value of lower level in the cell: it is subdivided and the new value is inserted. All further cells resulting therefrom receive the old value; top-down copying is thus used.

3.) There is a value of the same level in the cell: a comparison is made as to whether the new value is greater than the old value. If so, it replaces the old value. This will ensure that the subsequent ground area also takes into account the highest obstacle classified as ground.

If this method is applied to all ground pixels of each sensor image, then accumulation of the values automatically takes place over time; spatially, however, accumulation does not take place but instead only the ground pixel constituting the highest point is stored. The respective value is in this case stored cell-centered, since its exact position is not known because of the described measurement inaccuracy—it is only known that it must lie within the spatial vicinity defined by the cell.

Further account of the position accuracy of a point is taken by temporal weighting of the individual cell entries. The reason for this is the position of the aircraft, the accuracy of which in the locally geodetic system is dictated by that of the INS. An error of 0.2 m/s will be assumed as an example, which is a quite usual positioning error of an INS. This value expresses the fact that even after one second, the position of the aircraft relative to a point stored in the ground pixel container may be wrong by 0.2 m. In order to overcome this behavior, each stored point is provided with a lifetime and a weighting. The temporally weighted value $h_w$ within a quadtree cell is therefore determined from $h_w = \Sigma_{i=0}^{i_{max}} \alpha_i * h_i$ with the discretized weighting factors $\alpha_i$, the height values $h_i$ determined per sensor image and the maximum number of stored times $t_{max}$. The selection of the weighting function is subject to the condition $h_w = \Sigma_{i=1}^{i_{max}} \alpha_i = 1$. This type of weighting entails a spatial displacement of measured points within the ground pixel container, and is highly expedient for visualization of the height field. If, however, these data are intended to be written back into a geo-referenced database, then it is necessary to take this weighting into account.

Accumulation of the ground pixels over time and the fact that the center of the container is determined by the quantified position of the sensor (since this operation is carried out with a discrete grid), in the end imply a time variation of the position of the ground pixel container. Since, however, the container size is spatially constant, in the event of a displacement of the container new cells are respectively added but old cells also drop out. In order to avoid loss of these data, in the event of a grid movement they are stored in the linked elevation database 2. FIG. 4 shows this situation, the grid moving after a sufficient position change of the sensor with the step size of the predetermined discretization, i.e., the coarsest cell size according to Level0. While the cells colored dark gray in FIG. 4a are newly added, the white cells drop out and are stored in FIG. 4b in the elevation database 2.

In addition to storing the data from the ground pixel container, the elevation database 2 is used a second time in order to fill those cells of the container which still remain empty with elevation data. Because of the limited view of a sensor, i.e., not only in terms of range but also in terms of extent, i.e., aperture angle, only a region of the area which the ground pixel container represents is filled with sensor data in each case. Although this region becomes larger owing to accumulation of the sensor data over time, in particular owing to the movement of the aircraft, it is nevertheless very likely that regions of the area which the ground pixel container represents will remain empty. In order to achieve independency of the aperture angle for the visualization from the respective sensor aperture angle, empty regions are filled with elevation data from the elevation database 2, which will later lead to visual data fusion of sensor and elevation database data.

It should be noted that the elevation database 2 may also contain sensor data already stored at an earlier time.

The data of the filled ground pixel container are finally sent to the visualization algorithms, which are then responsible for the generation of representable geometry as well as visualization thereof. The data retention within the addressed quadtree is also advantageous here; thus, by restriction of the quadtree level to be considered, diverse level-of-detail (LOD) algorithms can be implemented very simply.

The elevation database 2 according to FIG. 1 initially consists of a record only of already available elevation data, which are provided with a particular resolution. During the sensor data recording, i.e., during the flight, these data are now employed in order to interact with the ground pixel container 3. As already explained, they are used here on the one hand to complete the only partially filled grid represented by the ground pixel container, and on the other hand for balancing and updating using the sensor data.

The readout of the elevation data from the database is instigated by the ground pixel container, i.e., for each empty cell of the ground pixel container the associated WGS84 position is calculated, which is used as a reference for the database access. As a result of the database query, a height value is obtained which is stored in accordance with its accuracy in the ground pixel container. Here again, the elevation data are explicitly enabled to further subdivide the existing grid of the ground pixel container in order to cope as far as possible with the sampling and error rates of the elevation database data.

The writing of the elevation data is likewise controlled by the ground pixel container. Here, all sensor data which either have a higher accuracy than the values previously existing in the database, or which with an equal accuracy are higher than the existing points, are stored in the database. The configuration of the database is in this case flexible, i.e. whether the data are replaced or only added is to be left up to the database design.

If the sensor fails, then all cells of the ground pixel container are populated with elevation data from the database, which would correspond to a so-called synthetic vision system.

The visualization consists of two modules and, according to FIG. 1, directly follows the ground pixel container 3 in the processing chain. So far, the data have been stored according to their measurement accuracy, but this representation is unsuitable for visualization since, as far as possible, a continuous area is desirable for the representation of a ground area in order not to distract the pilot with high-frequency varying point clouds.

The first step of the visualization provides preprocessing of the data from the ground pixel container, i.e., the quadtree. In this step, a coherent triangular grid is generated from the elevation data that, except for intentional holes, represents a continuous area. Since the data of the ground pixel container constitute a so-called unrestricted quadtree, i.e., the levels of neighboring cells may differ by more than 1, operation is carried here with so-called triangle fans. A triangle fan consists of a midpoint and various vertices lying around it, which are used for the triangle generation and are particularly suitable for representing the spanned area of a quadtree cell. FIG. 5 illustrates this geometry generation of a triangulation of the data of the ground pixel container. The cell-centered values respectively form the midpoint of a triangle fan. The continuity of the area is guaranteed by the connectivity of all neighboring cells, as for example the encircled vertex.

The second step consists in visualization of the calculated ground area. This may optionally be visualized as a triangle network in the wire grid representation or, in order to emphasize existing irregularities even further, also as an illuminated colored area.

The visualization is carried out from an arbitrary perspective, the flight status data being handled separately from the sensor data in this case. That is to say, changes to be taken into account in the flight attitude data of the aircraft, for example movements and direction changes, need not necessarily be represented with the usually lower frequency of the sensor data and therefore also of the ground area generation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A device for displaying terrain on a display device of an aircraft, comprising
    a synthetic vision system having a terrain and obstacle database;
    an enhanced vision system having sensors configured to acquire terrain data;
    a height and position sensor configured to determine flight status data;
    a display device;
    a fusion processor coupled to the synthetic and enhanced vision systems, wherein the fusion processor is configured to fuse the data from the synthetic and enhanced vision systems to generate terrain data, wherein height information generated by the synthetic and enhanced vision systems is stored as pixels in a two-dimensional grid network; and
    a graphics processor configured to send the terrain data generated by the fusion processor to the display device while taking into account the flight status data determined by the height and position sensor,
    wherein the fusion processor is configured to use an error function when inserting a pixel into the two-dimensional grid network, the error function providing an estimate of the size of the respective cell, in which the pixel is stored, from the distance of the pixel from the sensor position.

2. The device as claimed in claim 1, wherein the two-dimensional grid network represents a parameterization of a tangential surface of a terrestrial sphere with a hierarchical non-regular structure and a predeterminable maximum number of cells, and wherein a center of the two-dimensional grid network imaging the position of the sensor of the enhanced vision system.

3. A method for displaying terrain on a display device of an aircraft, comprising
    determining, by a height and position sensor, flight status data;
    acquiring, by an enhanced vision system having sensors, terrain data;
    fusing, by a fusion processor, data from a synthetic vision system and the enhanced vision system to generate terrain data, wherein height information generated by the synthetic and enhanced vision systems is stored as pixels in a two-dimensional grid network;
    outputting, by a graphics processor, the terrain data generated by the fusion processor to a display device while taking into account the flight status data determined by the height and position sensor,
    wherein the fusion processor uses an error function when inserting a pixel into the two-dimensional grid network, the error function providing an estimate of the size of the respective cell, in which the pixel is stored, from the distance of the pixel from the sensor position.

4. The method as claimed in claim 3, wherein the two-dimensional grid network represents a parameterization of a tangential surface of a terrestrial sphere with a hierarchical non-regular structure and a predeterminable maximum number of cells, and wherein a center of the two-dimensional grid network imaging the position of the sensor of the enhanced vision system.

* * * * *